United States Patent
Lu

(10) Patent No.: US 11,836,231 B2
(45) Date of Patent: Dec. 5, 2023

(54) ANDROID SYSTEM-BASED SMART TERMINAL UNLOCKING METHOD AND DEVICE, AND SMART TERMINAL

(71) Applicant: GREE ELECTRIC APPLIANCES, INC. OF ZHUHAI, Zhuhai (CN)

(72) Inventor: Liang Lu, Zhuhai (CN)

(73) Assignee: GREE ELECTRIC APPLIANCES, INC. OF ZHUHAI, Zhuhai (CN)

(*) Notice: Subject to any disclaimer, the term of this patent is extended or adjusted under 35 U.S.C. 154(b) by 455 days.

(21) Appl. No.: 17/052,734

(22) PCT Filed: Jul. 26, 2019

(86) PCT No.: PCT/CN2019/097815
§ 371 (c)(1),
(2) Date: Nov. 3, 2020

(87) PCT Pub. No.: WO2020/057256
PCT Pub. Date: Mar. 26, 2020

(65) Prior Publication Data
US 2021/0232668 A1    Jul. 29, 2021

(30) Foreign Application Priority Data
Sep. 18, 2018   (CN) .......................... 201811088880.7

(51) Int. Cl.
G06F 21/32 (2013.01)
G06F 9/448 (2018.01)
G06F 9/451 (2018.01)

(52) U.S. Cl.
CPC ............ *G06F 21/32* (2013.01); *G06F 9/4482* (2018.02); *G06F 9/451* (2018.02)

(58) Field of Classification Search
CPC .......... G06F 21/00; G06F 21/30; G06F 21/31; G06F 21/32; G06F 21/40; G06F 21/41
See application file for complete search history.

(56) References Cited

U.S. PATENT DOCUMENTS

2009/0264159 A1   10/2009   Hsieh et al.

FOREIGN PATENT DOCUMENTS

| CN | 104536836 A | 4/2015 |
| CN | 105389503 A | 3/2016 |

(Continued)

OTHER PUBLICATIONS

International Search Report for corresponding PCT/CN2019/097815, dated Oct. 25, 2019, 2 pages.

*Primary Examiner* — Kevin Kim
(74) *Attorney, Agent, or Firm* — Armstrong Teasdale LLP

(57) ABSTRACT

A smart terminal unlocking method and device employing an Android system, and a smart terminal are provided. The method includes that: a smart terminal receives a system unlocking operation performed by a user to acquire unlocking information; determines, according to the unlocking information, whether a system of the smart terminal is allowed to be unlocked; determines whether a lock screen program of a third-party application is running when the system is allowed to be unlocked; shuts the lock screen program of the third-party application when the lock screen program of the third-party application is running, and unlocks the system to enter a system interface; and directly unlocks the system to enter the system interface when the lock screen program of the third-party application is not running.

20 Claims, 3 Drawing Sheets

(56) References Cited

FOREIGN PATENT DOCUMENTS

| | | | | |
|---|---|---|---|---|
| CN | 105653301 A | * | 6/2016 | |
| CN | 106648316 A | * | 5/2017 | |
| CN | 106648316 A | | 5/2017 | |
| CN | 106980454 A | * | 7/2017 | ........... G06F 3/0487 |
| CN | 108008998 A | | 5/2018 | |

* cited by examiner

ANDROID SYSTEM-BASED SMART TERMINAL UNLOCKING METHOD AND DEVICE, AND SMART TERMINAL

RELATED APPLICATION

The present disclosure is a National Stage entry of International Patent Application No. PCT/CN2019/097815, filed Jul. 26, 2019, which claims the priority of the Chinese patent application with the application date of Sep. 18, 2018, the application number of 201811088880.7, and the patent name of "Android system-based smart terminal unlocking method and device, and smart terminal", which are herein incorporated by reference in their entirety.

TECHNICAL FIELD

The present disclosure relates to the field of terminal lock screens, and in particular to an Android system-based smart terminal unlocking method and device, and a smart terminal.

BACKGROUND

With the rapid development of science and technology, various terminals are continuously rich and convenient for people's lives. In order to avoid a false touch operation of a user on a terminal, the terminal generally has a lock screen function capable of displaying a single and fixed lock screen interface, thereby ensuring the usage security of the user. The user can unlock a screen in various manners, such as a password, a pattern and a fingerprint, wherein fingerprint unlocking has become a common function of a smart mobile terminal. At the same time, native interfaces often do not look particularly aesthetic, and in order to obtain richer visual and functional experience, users often install some interface optimization-type application programs, such as a lock screen application program and a music application program coming with a lock screen function. Since an operating system of the terminal has been configured with a lock screen function and a lock screen interface corresponding to the lock screen function, after the user installs another lock screen application program, a situation in which the user performs two unlocking operations to enter a system desktop may occur, and the user operation is too complex to quickly enter the desktop, thereby affecting the usage fluency of the user.

SUMMARY

In some embodiments of the present disclosure, an Android system-based smart terminal unlocking method is provided, the method includes that:
 a smart terminal receives a system unlocking operation performed by a user to acquire unlocking information, and determines, according to the unlocking information, whether a system of the smart terminal is allowed to be unlocked;
 when the system is allowed to be unlocked, the smart terminal determines whether a lock screen program of a third-party application is running;
 when the lock screen program of a third-party application is running, the smart terminal shuts the lock screen program of the third-party application, and unlocks the system to enter a system interface; and
 when the lock screen program of the third-party application is not running, directly unlocking the system to enter the system interface.

In some embodiments of the present disclosure, an Android system-based smart terminal unlocking device is provided, the device including:
 a receiving component, configured to receive a system unlocking operation performed by a user to acquire unlocking information, and determine, according to the unlocking information, whether a system of the smart terminal is allowed to be unlocked;
 a determination component, configured to determine whether a lock screen program of a third-party application is running when the system is allowed to be unlocked;
 a removing component, configured to shut the lock screen program of the third-party application when determining that the lock screen program of the third-party application is running; and an unlocking component, configured to unlock the system.

BRIEF DESCRIPTION OF THE DRAWINGS

The accompanying drawings incorporated in and forming a part of the specification illustrate embodiments consistent with the present disclosure and, together with the specification, serve to explain the principles of the present disclosure.

DETAILED DESCRIPTION

Hereinafter, the technical solutions in the present disclosure will be described clearly and thoroughly with reference to the accompanying drawings of the embodiments of the present disclosure. Obviously, the embodiments as described are some of the embodiments of the present disclosure, and are not all of the embodiments of the present disclosure.

Figure 1:
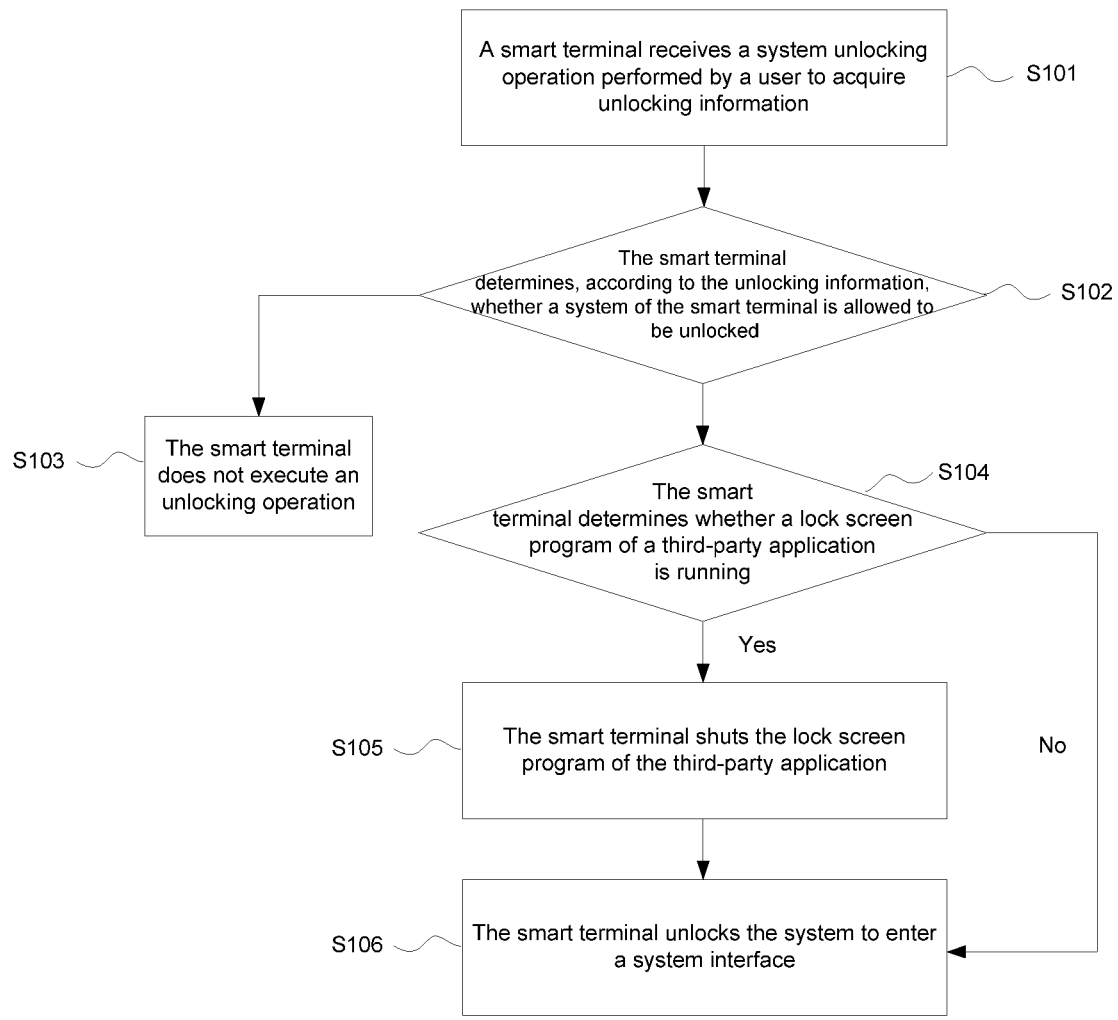
FIG. 1 is a flowchart of an Android system-based smart terminal unlocking method according to an exemplary embodiment of the present disclosure.

The embodiments of the present disclosure disclose an Android system-based smart terminal unlocking method. The flowchart of the method is as shown in FIG. 1, including the following steps.

At step S101, a smart terminal receives a system unlocking operation performed by a user to acquire unlocking information.

when the smart terminal is in a locked state and the smart terminal detects the system unlocking operation performed by the user, the smart terminal acquires information of the system unlocking operation.

When a program for unlocking a system of the smart terminal is a fingerprint unlocking program, the information of the system unlocking operation refers to fingerprint information of the unlocking operation performed by the user.

When the program for unlocking the system of the smart terminal is a human face image unlocking program, the information of the system unlocking operation refers to human face image information of the unlocking operation performed by the user.

At step S102, the smart terminal determines, according to the unlocking information, whether the system of the smart terminal is allowed to be unlocked.

The smart terminal matches the unlocking information with a pre-set unlocking password to determine whether the system of the smart terminal is allowed to be unlocked. When the unlocking information is not matched with the pre-set unlocking password, the system of the smart terminal is not allowed to be unlocked and step S103 is proceeded. When the unlocking information is matched with the pre-set unlocking password, the system of the smart terminal is allowed to be unlocked and step S104 is proceeded.

At step S103, the smart terminal does not execute an unlocking operation.

When the smart terminal fails to match the unlocking information with the pre-set unlocking password, the smart terminal determines that the system of the smart terminal is not allowed to be unlocked, and does not execute the unlocking operation.

At step S104, the smart terminal determines whether a lock screen program of a third-party application is running.

When the smart terminal successfully matches the collected unlocking information with the pre-set unlocking password, the smart terminal determines that the system of the smart terminal is allowed to be unlocked. And then the smart terminal invokes an interface of an operating system to acquire information of a top-level task stack which is currently running to determine whether the lock screen program of the third-party application is running. When the lock screen program of the third-party application is running, step S105 is proceeded. And when the lock screen program of the third-party application is not running, step S106 is proceeded.

At step S105, the smart terminal shuts the lock screen program of the third-party application.

When the smart terminal successfully matches the collected unlocking information with the pre-set unlocking password, the smart terminal determines that the system of the smart terminal is allowed to be unlocked. And then the smart terminal invokes an interface of an operating system of the smart terminal to acquire the information of the top-level task stack to determine that the lock screen program of the third-party application is running;

The smart terminal acquires the information of the top-level task stack via the interface and invokes a system function to remove an Activity at the top of the top-level task stack, so as to shut the lock screen program of the third-party application. The system function uses a flow provided by Android for removing a specific stack according to a stack identifier.

The smart terminal actively sends a key value of a HOME key to an Activity manager to remove the Activity at the top of the top-level task stack to shut the lock screen program of the third-party application.

At step S106, the smart terminal unlocks the system to enter a system interface.

When the screen of the smart terminal is in a screen-off state, the smart terminal unlocks the system in the screen-off state to enter the system interface.

When the screen of the smart terminal is in a screen-on state, the smart terminal changes to use an interface for unlocking in the screen-off state to unlock the system in the screen-off state, and eliminates the original animation of the native lock screen interface to enter the system interface.

Exemplary Embodiment One

Figure 2:
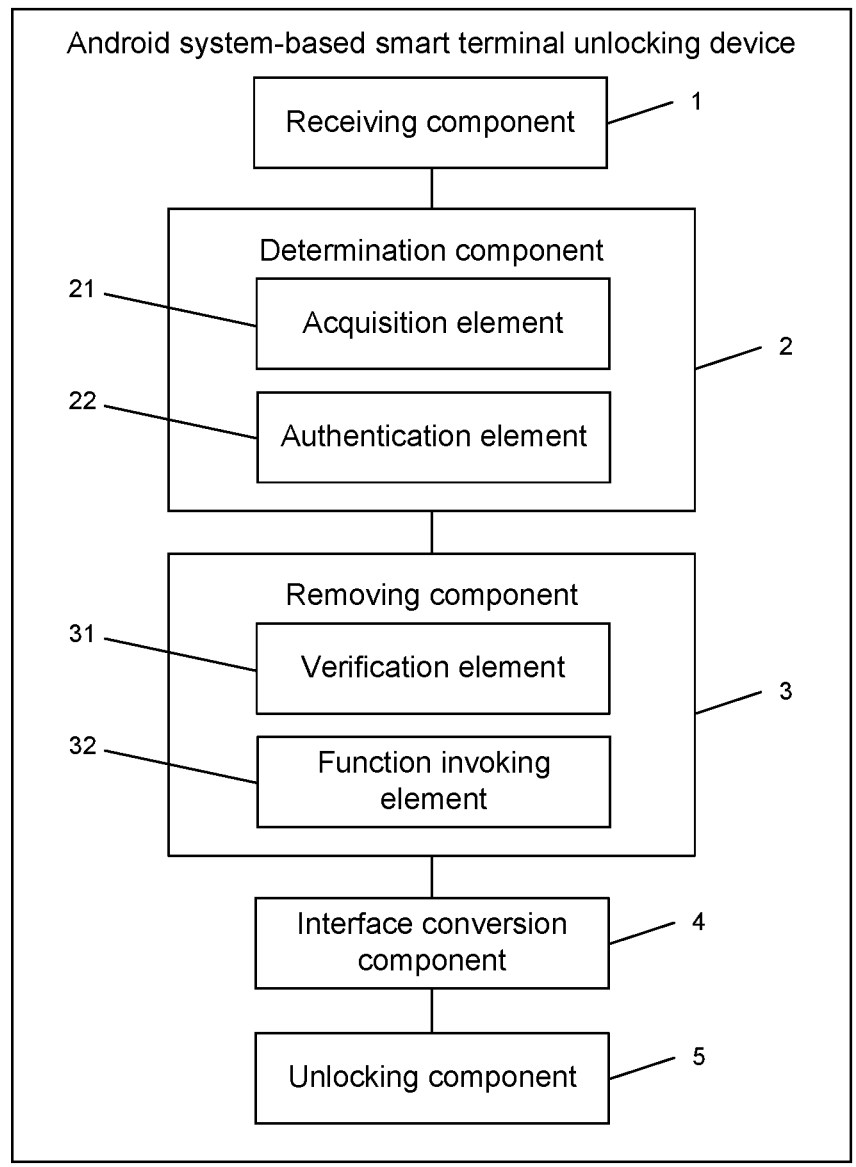
FIG. 2 is a schematic diagram of an Android system-based smart terminal unlocking device according to an exemplary embodiment of the present disclosure.

The embodiment of present disclosure provides an Android system-based smart terminal unlocking device, and a smart terminal. The smart terminal is provided with the Android system-based smart terminal unlocking device, and a schematic diagram of the device is as shown in FIG. 2, including: a receiving component 1, a determination component 2, a removing component 3, an interface conversion component 4 and an unlocking component 5.

The receiving component 1 is configured to receive a system unlocking operation performed by a user to acquire unlocking information, and determine, according to the unlocking information, whether a system of the smart terminal is allowed to be unlocked. When the system unlocking operation triggered by the user is detected, the receiving component 1 is configured to acquire information of the system unlocking operation performed by the user;

When the program for unlocking the system is a fingerprint unlocking program, the receiving component 1 acquires fingerprint information of a fingerprint unlocking operation performed by the user.

When the program for unlocking the system is a human face image unlocking program, the receiving component 1 acquires human face image information of a human face image unlocking operation performed by the user.

The determination component 2 is configured to, when the system is allowed to be unlocked, determine whether a lock screen program of a third-party application is running. The determination component 2 includes: an acquisition element 21, configured to acquire a top-level task stack which is currently running; and an authentication element 22, configured to determine whether the top-level task stack acquired by the acquisition element 21 is the lock screen program of the third-party application.

After acquiring the top-level task stack which is currently running, the acquisition element 21 sends the information of the top-level task stack to the authentication element 22, and the authentication element 22 determines whether the top-level task stack is the lock screen program of the third-party application according to the information of the top-level task stack, the information of the acquired top-level task stack including an identifier of the top-level task stack.

The removing component 3 is configured to, when determining that the lock screen program of the third-party application is running, shut the lock screen program of the third-party application. The removing component 3 includes: a verification element 31, configured to verify whether the top-level task stack acquired by the acquisition element 21 is not empty; and a function invoking element 32, configured to invoke a system function to remove an Activity at the top of the top-level task stack.

After the authentication element 22 determines, according to the information of the top-level task stack acquired by the acquisition element 21, that the top-level task stack is the lock screen program of the third-party application, the verification element 31 verifies whether the top-level task stack acquired by the acquisition element 21 is not empty, and when the top-level task stack acquired by the acquisition element 21 is not empty, the function invoking element 32 removes the Activity at the top of the top-level task stack.

When the system is allowed to be unlocked and a screen of a smart terminal is in a screen-on state, the interface conversion component 4 converts an unlocking interface from being in a screen-on state to be in a screen-off state.

The unlocking component 5 is configured to unlock a lock screen interface of the system. The unlocking component 5 unlocks the system according to the unlocking information collected by the receiving component 1.

Exemplary Embodiment Two

Figure 3:
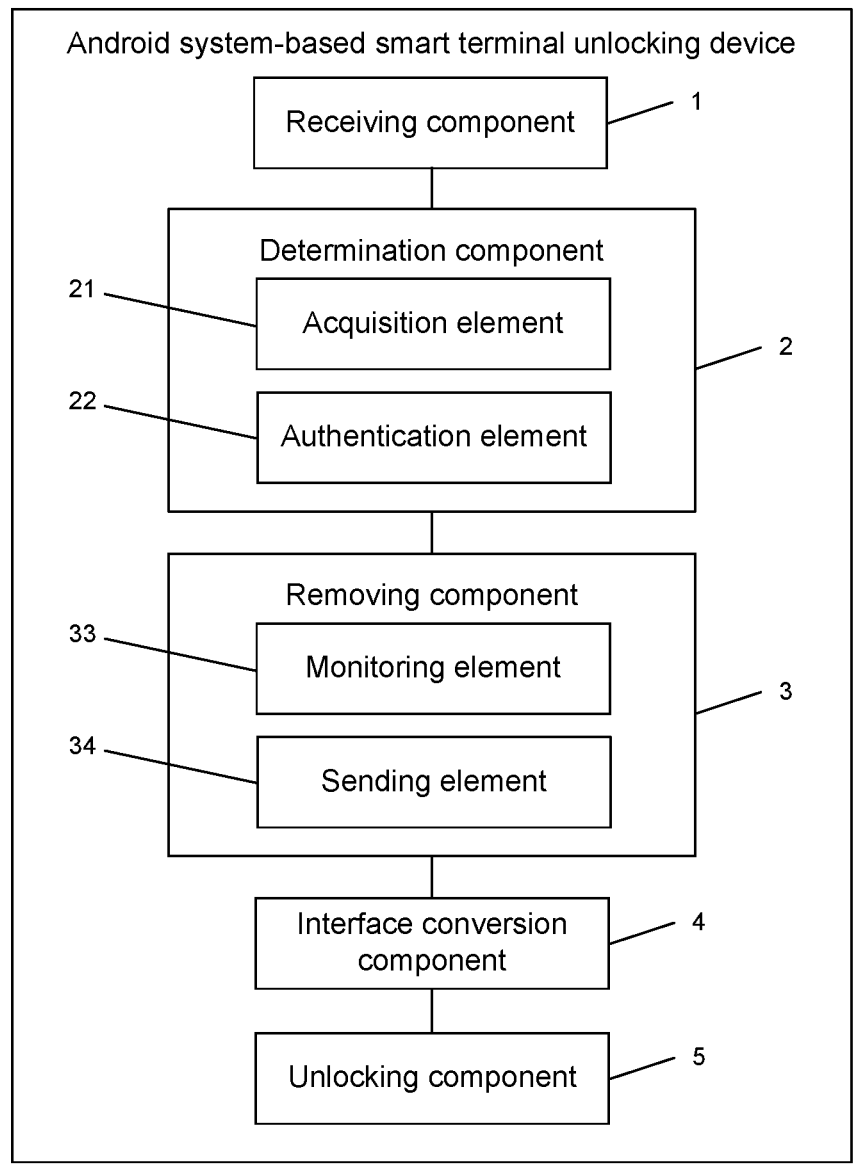
FIG. 3 is a schematic diagram of an Android system-based smart terminal unlocking device according to another exemplary embodiment of the present disclosure.

The embodiment of present disclosure provides an Android system-based smart terminal unlocking device, and a smart terminal. The smart terminal is provided with the Android system-based smart terminal unlocking device, and a schematic diagram of the device is as shown in FIG. 3, including: a receiving component 1, a determination component 2, a removing component 3, an interface conversion component 4 and an unlocking component 5.

The receiving component 1 is configured to receive a system unlocking operation performed by a user to acquire unlocking information, and determine, according to the unlocking information, whether a system of the smart terminal is allowed to be unlocked. When the system unlocking operation triggered by the user is detected, the receiving component 1 acquires information of the system unlocking operation performed by the user;

When the program for unlocking the system is a fingerprint unlocking program, the receiving component 1 acquires fingerprint information of a fingerprint unlocking operation performed by the user.

When the program for unlocking the system is a human face image unlocking program, the receiving component 1 acquires human face image information of a human face image unlocking operation performed by the user.

The determination component 2 is configured to, when the system is allowed to be unlocked, determine whether a lock screen program of a third-party application is running. The determination component 2 includes: an acquisition element 21, configured to acquire a top-level task stack which is currently running; and an authentication element 22, configured to determine whether the top-level task stack acquired by the acquisition element 21 is the lock screen program of the third-party application.

After acquiring the top-level task stack which is currently running, the acquisition element 21 sends the information of the top-level task stack to the authentication element 22, and the authentication element 22 determines whether the top-level task stack is the lock screen program of the third-party application according to the information of the top-level task stack, the information of the acquired top-level task stack including an identifier of the top-level task stack.

The removing component 3 is configured to, when determining that the lock screen program of the third-party application is running, shut the lock screen program of the third-party application. The removing component 3 includes: a monitoring element 33, configured to monitor a HOME key to acquire a key value of the HOME key; and a sending element 34, configured to actively send the key value of the HOME key acquired by the monitoring element 33 to an Activity manager.

After the authentication element 22 determines, according to the information of the top-level task stack acquired by the acquisition element 21, that the top-level task stack is the lock screen program of the third-party application, the monitoring element 33 acquires the key value of the HOME key, and the sending element 34 actively sends the key value of the HOME key acquired by the monitoring element 33 to the Activity manager to remove the Activity at the top of the top-level task stack.

When the system is allowed to be unlocked and a the screen of a smart terminal is in a screen-on state, the interface conversion component 4 converts an unlocking interface from being in a screen-on state to be in a screen-off state.

The unlocking component 5 is configured to unlock a lock screen interface of the system. The unlocking component 5 unlocks the system according to the unlocking information collected by the receiving component 1.

It may be understood that the present disclosure is described through some embodiments, and those skilled in the art should appreciate that various modifications and equivalent replacements can be made to these features and embodiments without departing from the spirit and scope of the present disclosure. In addition, with the teachings of the present disclosure, these features and embodiments can be modified to adapt to specific situations and materials without departing from the spirit and scope of the present disclosure. Therefore, the present disclosure is not limited to the specific embodiments disclosed herein, and all embodiments belonging to the scope of the claims of the present disclosure shall belong to the scope of protection of the present disclosure.

It should be understood that the same or similar parts in the foregoing embodiments may refer to each other. For content not described in detail in some embodiments, reference may be made to the same or similar content in other embodiments.

It should be noted that in the description of the present disclosure, the terms such as "first", "second" and "third" are used for descriptive purposes, and cannot be understood as indicating or implying relative importance. In addition, in the description of the present disclosure, unless otherwise stated, "multiple" refers to two or more.

Any process or method description described in a flowchart or otherwise herein may be understood as representing a component, segment, or portion of code, which includes at least one executable instruction for implementing specified logical functions or steps of the process, and the scope of alternative embodiments of the present disclosure includes additional implementations, wherein functions may be executed out of the order shown or discussed, including in a substantially simultaneous manner or in a reversed order depending on the function involved. This should be understood by those skilled in the art to which the embodiments of the present disclosure belong.

It should be understood that various portions of the present disclosure may be implemented through hardware, software, firmware, or a combination thereof. In the described implementation, a plurality of steps or methods may be implemented through software or firmware stored in a memory and executed by a suitable instruction execution system. For example, when it is implemented through hardware, as in another implementation, it may be implemented by any one or combination of the following technologies known in the art: a discrete logic circuit having a logic gate circuit for implementing a logic function on a data signal, an application-specific integrated circuit having a suitable combination logic gate circuit, a programmable gate array (PGA), a field-programmable gate array (FPGA), and the like.

Those skilled in the art can understood that all or part of the steps in the method according to the embodiments above can be implemented by a program instructing relevant hardware; the program can be stored in a computer-readable storage medium; and when executed, the program includes one or a combination of the steps in the method according to the embodiments.

In addition, the functional elements in respective embodiments of the present disclosure may be integrated in one processing component, or the elements may be physically and individually present, or two or more elements are integrated in one component. The integrated component may be embodied in the form of hardware or in the form of a software functional component. The integrated component, when implemented in the form of a software functional component and sold or used as a stand-alone product, may also be stored in a computer-readable storage medium.

The storage medium mentioned above may be a read-only memory, a magnetic disk, or an optical disk, etc.

In the descriptions of the specification, reference to terms "one embodiment", "some embodiments", "example", "particular example" or "some examples" means that a particular feature, structure, material or characteristic described in combination with the embodiment or example is included in at least one embodiment or example of the present disclosure. In the present specification, the schematic expressions of the terms above are not necessarily referring to the same embodiment or example. Moreover, the described particular features, structures, materials or characteristics can be combined in any suitable way in any at least one embodiment or example.

Although the embodiments of the present disclosure have been shown and described above, it may be understood that the embodiments above are exemplary and cannot be understood as limiting the present disclosure, and those skilled in the art can make changes, modifications, substitutions and variations to the embodiments above within the scope of the present disclosure.

What is claimed is:

1. An Android system-based smart terminal unlocking method, comprising:
   a smart terminal receiving a system unlocking operation performed by a user to acquire unlocking information, and determining, according to the unlocking information, whether a system of the smart terminal is allowed to be unlocked;
   when the system is allowed to be unlocked, determining whether a lock screen program of a third-party application is running;
   when the lock screen program of the third-party application is running, shutting the lock screen program of the third-party application, and unlocking the system to enter a system interface; and
   when the lock screen program of the third-party application is not running, directly unlocking the system to enter the system interface.

2. The Android system-based smart terminal unlocking method as claimed in claim 1, wherein the system unlocking information is a fingerprint of the user.

3. The Android system-based smart terminal unlocking method as claimed in claim 1, further comprising:
   the smart terminal acquiring a top-level task stack which is currently running through an Activity manager, and determining, according to information of the top-level task stack, whether the top-level task stack is the lock screen program of the third-party application.

4. The Android system-based smart terminal unlocking method as claimed in claim 3, wherein shutting the lock screen program of the third-party application comprises:
   invoking a system function to remove an Activity at the top of the top-level task stack to shut the lock screen program of the third-party application.

5. The Android system-based smart terminal unlocking method as claimed in claim 4, wherein the system function uses a flow provided by Android for removing a specific stack according to a stack identifier.

6. The Android system-based smart terminal unlocking method as claimed in claim 3, wherein shutting the lock screen program of the third-party application comprises:
   actively sending a key value of a HOME key to an Activity manager to remove the Activity at the top of the top-level task stack.

7. An Android system-based smart terminal unlocking device comprising a hardware processor coupled with a memory and configured to execute program components stored on the memory, wherein the program components comprise:
   a receiving component, configured to receive a system unlocking operation performed by a user to acquire unlocking information, and determine, according to the unlocking information, whether a system of the smart terminal is allowed to be unlocked;
   a determination component, configured to determine whether a lock screen program of a third-party application is running when the system is allowed to be unlocked;
   a removing component, configured to shut the lock screen program of the third-party application when determining that the lock screen program of the third-party application is running; and
   an unlocking component, configured to unlock the system.

8. The Android system-based smart terminal unlocking device as claimed in claim 7, wherein the determination component comprises:
   an acquisition element, configured to acquire a top-level task stack which is currently running; and
   an authentication element, configured to determine whether the top-level task stack acquired by the acquisition element is the lock screen program of the third-party application.

9. The Android system-based smart terminal unlocking device as claimed in claim 8, wherein the removing component comprises:
   a verification element, configured to verify whether the top-level task stack acquired by the acquisition element is not empty.

10. The Android system-based smart terminal unlocking device as claimed in claim 8, wherein the removing component comprises:
    a function invoking element, configured to invoke a system function to remove an Activity at the top of the top-level task stack.

11. The Android system-based smart terminal unlocking device as claimed in claim 8, wherein the removing component comprises:
    a monitoring element, configured to monitor a HOME key to acquire a key value of the HOME key; and
    a sending element, configured to actively send the key value of the HOME key acquired by the monitoring element to an Activity manager to remove the Activity at the top of the top-level task stack.

12. The Android system-based smart terminal unlocking device as claimed in claim 7, the program components further comprising:
    an interface conversion component, configured to, when the system is allowed to be unlocked and a screen of a smart terminal is in a screen-on state, convert an unlocking interface from being in a screen-on state to be in a screen-off state.

13. A smart terminal, wherein the smart terminal is provided with the Android system-based smart terminal unlocking device comprising: a hardware processor coupled with a memory and configured to execute program components stored on the memory, wherein the program components comprise:
    a receiving component, configured to receive a system unlocking operation performed by a user to acquire unlocking information, and determine, according to the unlocking information, whether a system of the smart terminal is allowed to be unlocked;

a determination component, configured to determine whether a lock screen program of a third-party application is running when the system is allowed to be unlocked;

a removing component, configured to shut the lock screen program of the third-party application when determining that the lock screen program of the third-party application is running; and an unlocking component, configured to unlock the system.

14. The Android system-based smart terminal unlocking method as claimed in claim 1, wherein when the smart terminal is in a locked state and the smart terminal detects the system unlocking operation performed by the user, the smart terminal acquires information of the system unlocking operation.

15. The Android system-based smart terminal unlocking method as claimed in claim 14, wherein when a program for unlocking a system of the smart terminal is a fingerprint unlocking program, the information of the system unlocking operation refers to fingerprint information of the unlocking operation performed by the user.

16. The Android system-based smart terminal unlocking method as claimed in claim 14, wherein when the program for unlocking the system of the smart terminal is a human face image unlocking program, the information of the system unlocking operation refers to human face image information of the unlocking operation performed by the user.

17. The Android system-based smart terminal unlocking method as claimed in claim 1, wherein the smart terminal matches the unlocking information with a pre-set unlocking password to determine whether the system of the smart terminal is allowed to be unlocked.

18. The Android system-based smart terminal unlocking method as claimed in claim 17, wherein when the unlocking information is not matched with the pre-set unlocking password, the system of the smart terminal is not allowed to be unlocked.

19. The Android system-based smart terminal unlocking method as claimed in claim 17, wherein when the unlocking information is matched with the pre-set unlocking password, the system of the smart terminal is allowed to be unlocked.

20. The Android system-based smart terminal unlocking method as claimed in claim 17, wherein when the smart terminal fails to match the unlocking information with the pre-set unlocking password, the smart terminal determines that the system of the smart terminal is not allowed to be unlocked, and does not execute the unlocking operation.

* * * * *